United States Patent
De Pau, Jr. et al.

(10) Patent No.: US 11,098,649 B2
(45) Date of Patent: Aug. 24, 2021

(54) SELF-REGULATING BACK-SIDE PRESSURIZATION SYSTEM FOR THERMAL INSULATION BLANKETS

(71) Applicant: The Boeing Company, Chicago, IL (US)

(72) Inventors: Robert De Pau, Jr., Kenmore, WA (US); Kimberly A. Miller, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 323 days.

(21) Appl. No.: 16/040,372

(22) Filed: Jul. 19, 2018

(65) Prior Publication Data

US 2020/0025091 A1    Jan. 23, 2020

(51) Int. Cl.
*F02C 7/24* (2006.01)
*F02C 3/06* (2006.01)
(Continued)

(52) U.S. Cl.
CPC ............. *F02C 7/24* (2013.01); *B64D 37/32* (2013.01); *F02C 3/06* (2013.01); *F02C 6/08* (2013.01); *F02C 7/18* (2013.01); *F02C 9/18* (2013.01); *F02K 1/822* (2013.01); *F04D 27/0207* (2013.01); *G06F 30/20* (2020.01); *F05D 2220/323* (2013.01); *F05D 2260/201* (2013.01); *F05D 2260/81* (2013.01); *G06F 2111/10* (2020.01)

(58) Field of Classification Search
CPC .. F01D 25/145; F02C 7/24; F02C 7/25; F02K 1/822
See application file for complete search history.

(56) References Cited

U.S. PATENT DOCUMENTS 2,705,208 A  *  3/1955  Schweikert ............... F02C 7/24
                                                   60/685
3,847,208 A  *  11/1974  Ollendorf ................ B64G 1/58
                                                   165/47

(Continued)

FOREIGN PATENT DOCUMENTS

GB          878195 A  *  9/1961  ............. F02K 1/822

*Primary Examiner* — Gerald L Sung
*Assistant Examiner* — Marc J Amar
(74) *Attorney, Agent, or Firm* — Gates & Cooper LLP

(57) ABSTRACT

High-pressure fan duct bleed air is used to pressurize a cavity between the fan duct inner wall and the inner wall thermal insulation blankets. The cavity is pressurized to prevent hot air from the nacelle core compartment from flowing under the insulation blankets and degrading the fan duct inner wall. Pressure regulating valves (PRV) allow better control of the cavity pressure during different phases of the flight profile and under different levels of insulation blanket seal degradation by passively controlling exit area from the cavity based on an established pressure limit. Moreover, the pressurization system can be implemented as a passive cooling system by increasing the mass flow rate into the cavity and then the core compartment to a level suitable for core compartment cooling. The cooling air can be vented at the forward end of the insulation blanket assembly to provide core compartment ventilation flow, or vented through dedicated ports in the insulation blanket for targeted core compartment component cooling.

21 Claims, 16 Drawing Sheets

(51) Int. Cl.
*F02C 9/18* (2006.01)
*F02C 7/18* (2006.01)
*G06F 30/20* (2020.01)
*F02C 6/08* (2006.01)
*B64D 37/32* (2006.01)
*F04D 27/02* (2006.01)
*F02K 1/82* (2006.01)
*G06F 111/10* (2020.01)

(56) References Cited

U.S. PATENT DOCUMENTS

| | | | | |
|---|---|---|---|---|
| 4,441,314 A * | 4/1984 | Fitton | F02C 7/25 | 60/266 |
| 4,511,106 A * | 4/1985 | Graves | F28F 9/005 | 248/232 |
| 4,522,673 A * | 6/1985 | Fell | F02C 7/25 | 156/307.3 |
| 4,815,281 A * | 3/1989 | Gely | F02C 7/042 | 60/226.1 |
| 4,926,633 A * | 5/1990 | Nash | F01D 25/12 | 60/226.1 |
| 5,127,222 A * | 7/1992 | Ream | F02C 7/14 | 60/204 |
| 5,357,742 A * | 10/1994 | Miller | F02C 7/18 | 60/785 |
| 6,202,403 B1 * | 3/2001 | Laborie | B64D 33/08 | 60/39.83 |
| 6,227,800 B1 * | 5/2001 | Spring | F02C 7/18 | 415/116 |
| 7,665,310 B2 * | 2/2010 | Laborie | F02C 7/12 | 60/806 |
| 2003/0111238 A1 * | 6/2003 | Anderson | A62C 3/08 | 169/54 |
| 2003/0140615 A1 * | 7/2003 | Le Docte | F02K 1/822 | 60/226.1 |
| 2004/0184912 A1 * | 9/2004 | Crozet | F01D 11/24 | 415/191 |
| 2006/0162338 A1 * | 7/2006 | Prociw | F01D 21/00 | 60/779 |
| 2008/0230651 A1 * | 9/2008 | Porte | F02C 7/14 | 244/118.5 |
| 2014/0000279 A1 * | 1/2014 | Brousseau | F02C 9/18 | 60/782 |
| 2014/0133964 A1 * | 5/2014 | Ayle | F02C 7/24 | 415/119 |
| 2015/0098810 A1 * | 4/2015 | Soria | F01D 25/28 | 415/200 |
| 2015/0260101 A1 * | 9/2015 | Teia Dos Santos Medes Gomes | F02C 7/18 | 60/39.091 |
| 2015/0267616 A1 * | 9/2015 | Verseux | B64D 33/08 | 60/772 |
| 2015/0369171 A1 * | 12/2015 | Papa | F02K 1/76 | 60/226.2 |
| 2017/0002746 A1 * | 1/2017 | Sawyers-Abbott | F01D 25/24 | |
| 2017/0191420 A1 * | 7/2017 | Clarke | F01D 17/085 | |
| 2017/0356343 A1 * | 12/2017 | Roach | F01D 25/145 | |
| 2018/0016933 A1 * | 1/2018 | Elbibary | F01D 21/12 | |
| 2018/0023475 A1 * | 1/2018 | Xu | F01D 9/065 | 60/806 |
| 2018/0283217 A1 * | 10/2018 | de Pau, Jr. | B64C 1/1453 | |
| 2019/0086082 A1 * | 3/2019 | Haile | F02C 7/268 | |
| 2019/0218978 A1 * | 7/2019 | Edwards | F02C 7/268 | |
| 2020/0400029 A1 * | 12/2020 | Lu | B64D 29/06 | |

* cited by examiner

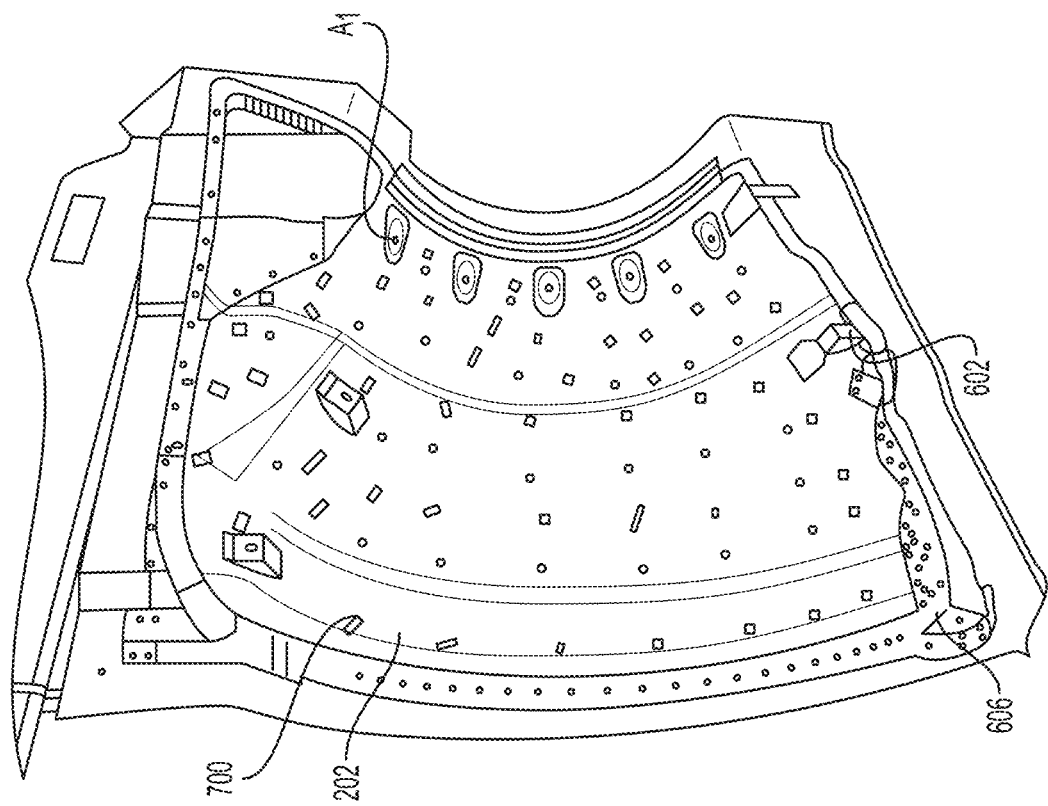

SELF-REGULATING BACK-SIDE PRESSURIZATION SYSTEM FOR THERMAL INSULATION BLANKETS

BACKGROUND

1. Field

The present disclosure relates to pressurization and/or cooling systems for use with aircraft engines.

2. Description of the Related Art

FIG. 1 is a schematic view of an exemplary aircraft engine 62 and the portion of the nacelle 60 that comprises the fan duct inner flow surface 80 and outer flow surface 900. Engine 62 also generally includes a fan system 910 and an engine core 65 including a compressor 66 and a turbine 70. Engine 60 is typically attached to the wings, fuselage, or tail of an aircraft through appropriate mountings, for example, a pylon. Nacelle 60 includes an engine inlet (not depicted) that defines an air intake duct 78 for supplying air to the fan system 910, which subsequently is directed both to the fan duct 64 and engine core 65.

FIG. 1 farther illustrates the fan duct 64 is divided between the engine 62 and nacelle 60 at the dashed line 80a. Forward of the dashed line 80c, the fan duct inner flow surface 80 is comprised of the core fairing 80b and the fan duct outer flow surface 900 is comprised of the fan case 900b. Aft of the dashed line, the fan duct inner flow surface 80 is comprised of the nacelle inner wall 80c and nacelle outer wall 900c. The nacelle inner 80c contains an insulation blanket 85. The insulation blanket 85 is positioned so that the blanket cavity 90 is formed between the nacelle inner wall 80c and the insulation blanket 85.

FIG. 1 further illustrates a core compartment 95. The exterior boundary of the core compartment 95 is defined by the engine core fairing 80b and insulation blanket 85 surfaces. The interior boundary of the core compartment is defined by the engine core 65 casing surfaces.

The engine core 65 heats the air in the core compartment 95. For safety reasons, it is important to prevent hot air from the core compartment 95 from circumventing the insulation blanket 85 and leaking into the blanket cavity 90, where it can damage the nacelle inner 80c. To reduce such leakage, modern systems use back-side pressurization systems that pressurize the a blanket cavity 90 on an exterior of the core compartment 95. The blanket cavity 90 has an inlet port 100 with a fixed inlet area to the fan duct and an exit port 102 with a fixed exit area to the core compartment 95. Higher pressurization of the blanket cavity 90 relative to the core compartment 95 surrounding the engine core 65 reduces flow of hot air from the core compartment 95 towards the nacelle inner wall 80c.

However, the fixed area of the inlet 100 and exit 102 means the pressure in the blanket cavity will vary as the system boundary conditions change. For example, higher fan duct pressures at takeoff will result in higher blanket cavity pressures as compared with lower pressures at cruise. This variability in blanket cavity pressures is undesirable because the system must be sub-optimized for a single corner-case condition to prevent over-pressurization. Such a system is also unable to counteract damage to the insulation blanket seals beyond small leakages, as the increase in exit area caused by the leak will lower the under-blanket pressure.

Seals and sealant used to seal the gap between the nacelle inner wall 80c and insulation blanket 85 degrades over time due to the severe thermal environment. Damage to the seals and sealant which is not detected and repaired increases the risk of hot air leakage and thermal degradation to nacelle inner wall 80c.

Finally, the inlet port 100 and exit port 102 through the nacelle inner wall 80b and insulation blanket 85, respectively, are sized only to pressurize the blanket cavity 90—the amount of air flowing out of the exit port 102 is not adequate to provide passive cooling of the core compartment 95. For this reason, the system of FIG. 1 has a separate inlet port 104 in the fan duct inner flow surface 80, often through the engine core fairing 80b, wherein the inlet port 104 provides passive cooling flow for the core compartment 95. As such, the core compartment passive cooling system is separate from the insulation blanket pressurization system.

What is needed are pressurization systems that are safer, more efficient, mitigate for leakage, and prevent damage to insulation blanket seals over a wider range of aircraft flight conditions. What is also needed are pressurization systems which also provide enough airflow to achieve passive cooling for the core compartment. The present disclosure satisfies these needs.

SUMMARY

The present disclosure describes an aircraft engine, comprising an engine core; a fan duct including an inner wall; a first orifice through the inner wall; an insulation blanket coupled to the inner wall so as to shield the inner wall from heat generated in the engine core; a second orifice through the insulation blanket; a cavity bounded by the inner wall and the insulation blanket, the cavity receiving air inputted into the cavity through the first orifice from the fan duct; a core compartment within the fan duct and housing the engine core, the core compartment having a first boundary with the engine core and second boundary with the insulation blanket; and a valve coupled to the second orifice and regulating flow of the air passing through the second orifice such that pressure P2 in the cavity exceeds pressure P3 in the core compartment, the pressure P2 suppressing flow of hotter air from the core compartment into the cavity.

The aircraft engine can be embodied many ways including, but not limited to, the following examples.

1. The engine wherein the valve is a pressure relief valve controlling an area of the second orifice so that pressure P2 in the cavity is greater than the pressure P3 in the core compartment during take-off, flight, and landing of an aircraft including the aircraft engine.

2. The engine of one or any combination of previous embodiments wherein the valve includes a spring coupled to a valve seat, the spring counteracting the pressure P2 on the valve seat such that the valve is always in equilibrium.

3. The aircraft engine of embodiment 2, wherein, if the pressure in the cavity decreases, the spring actuates the valve seat to decrease an area of an opening through the valve so as to return to the valve to equilibrium; and if the pressure in the cavity increases, the spring actuates the valve seat to increase the area of the opening through the valve to return the valve to equilibrium.

4. The aircraft engine of one or any combination of the previous embodiments, wherein the valve controls an area of the second orifice so that the pressure P2 in the cavity is uniform to within 10% A across the first boundary and the second boundary.

5. The aircraft engine of one or any combination of the previous embodiments, wherein first orifice has a first surface area transmitting the air, the second orifice has a second surface area transmitting the air, and the first surface area is smaller than the second surface area.

6. The aircraft engine of one or any combination of the previous embodiments, wherein the first orifice has a diameter or sides having a length in a range of 0.1-0.5 inches and the second orifice has a diameter or sides having a length in a range of 0.5-1.5 inches.

7. The aircraft engine of one or any combination of the previous embodiments, wherein the inner wall includes 3-20 first orifices and the insulation blanket includes 1-20 second orifices.

8. The aircraft engine of one or any combination of the previous embodiments wherein the second orifice is positioned to direct the air through the second orifice to a predetermined location on the first boundary that is thermally coupled to a component in the engine core, the air impinging at the predetermined location cools the component.

9. The aircraft engine of embodiment 8, wherein the component is a sensor or valve in the core compartment.

The present disclosure further describes an aircraft engine, comprising an engine core; a fan duct including an inner wall; a first orifice through the inner wall; an insulation blanket coupled to the inner wall so as to shield the inner wall from heat generated in the engine core; a second orifice through the insulation blanket; a cavity bounded by the inner wall and the insulation blanket, the cavity receiving air inputted into the cavity through the first orifice from the fan duct; a core compartment within the fan duct and housing the engine core, the core compartment having a first boundary with the engine core and second boundary with the insulation blanket; and the second orifice in the insulation blanket at a forward end of the core compartment allows the air from the fan duct to enter the core compartment and cool the core compartment as the air flows aft to the exit. In one example, the engine further comprises a tube connected to the second orifice, the tube delivering the air to a specific area or component in the core compartment where dedicated cooling is required. In yet a further example, a valve is connected to the tube, wherein the valve regulates flow of the air in the tube.

In one or more embodiments, the thermal insulation pressurization and core compartment cooling are combined into one system. In one or more such embodiments, a valve is coupled to the second orifice (A2) and regulates flow of the air passing through the second orifice such that (1) pressure P2 in the cavity exceeds pressure P3 in the core compartment, the pressure P2 suppressing flow of hotter air from the core compartment into the cavity, and (2) the air from the fan duct enters the core compartment and cools the core compartment as the air flows aft to the exit.

The present disclosure further describes a method of regulating pressure within an aircraft engine, comprising providing an aircraft engine as described herein; coupling the pressure P2 to the core compartment through the second orifice; and regulating the pressure P2 in the cavity so that the pressure P2 in the cavity exceeds a pressure P3 in the core compartment and suppresses flow of hotter air from the core compartment into the cavity.

The method can be embodied in many ways including, but not limited to, the following.

1. The method comprising regulating flow of the portion of the air through the second orifice into the core compartment, using a valve coupled to the second orifice, wherein the regulating controls the pressure P2.

2. The method of one or any combination of previous embodiments further comprising directing a portion of the air through the second orifice into the core compartment to a predetermined location, so as to cool a component located in the engine core.

The present disclosure further describes a method of making a pressurization system in an aircraft engine as described herein, comprising determining sizing and positioning of first orifices and second orifices in a pressurization system in an aircraft engine, using an iterative process including computational fluid dynamics analysis, flow network modeling, laboratory testing, and flight testing. The sizing and positioning are determined such that pressure P2 in the cavity exceeds pressure P3 in the core compartment, the pressure P2 suppressing flow of hotter air from the core compartment into the cavity, at all times during take-off, landing, and flight of the aircraft powered by the aircraft engine.

In one or more examples, the method further comprises:
 (a) performing the Computational Fluid Dynamics (CFD) analysis, wherein the CFD analysis determines pressure in the cavity as a function of size of the first orifices, size of the second orifices, height of the cavity, and the positioning of the first orifices and the second orifices;
 (b) selecting the height of the cavity, the size of the first orifices, the size of the second orifices, and the positioning of the first orifices and the second orifices such that the pressure P2 in the cavity exceeds pressure P3 in the core compartment according to the CFD analysis;
 (c) manufacturing the pressurization system having the height, the size of the first orifices, the size of the second orifices, and positioning of the first orifices and the second orifices selected in step (b);
 (d) performing the laboratory testing measuring pressure distribution, including initial pressure boundary conditions, in the pressurization system manufactured in step (c) for a plurality of airflow rates in the fan duct encountered during the flight, the take-off, and the landing of the aircraft powered by the aircraft engine;
 (c) performing the flow network modeling, comprising:
  (i) constructing a flow network model modeling the pressure distribution as a function of altitude of the aircraft and engine thrust of the aircraft engine, using the initial pressure boundary conditions; and
  (ii) using the flow network model to obtain updated sizing and positioning of the first orifices and the second orifices that achieve the pressure P2 in the cavity that exceeds the pressure P3 in the core compartment when the pressurization system is installed in the aircraft engine on the aircraft, wherein the pressure is uniform within 10% across the first boundary and the second boundary during the take-off, the flight, and the landing of the aircraft;
 (f) installing the pressurization system comprising the first and second orifices having the updated sizing and positioning, in the aircraft engine on the aircraft; and
 (g) measuring actual pressure distribution and actual boundary conditions in the pressurization system installed in the aircraft engine on the aircraft so as to determine whether, at all times during the take-off, the landing, and the flight of the aircraft:
  (1) the pressure P2 in the cavity exceeds the pressure P3 in the core compartment, and
  (2) the pressure P2 in the cavity is uniform within 10% across the first boundary and the second boundary.

In one or more examples, the method further comprises comparing the actual pressure distribution with the pressure distribution modeled using the flow network model; updating the flow network model using the actual boundary conditions that are different from the initial boundary conditions, so as to form an updated flow network model; using the updated flow network model to obtain further updated sizing and positioning of the first orifices and the second orifices that achieve the pressure P2 in the cavity that exceeds the pressure P3 in the core compartment when the pressurization system is installed in the aircraft engine, wherein the pressure is uniform within 10% across the first boundary and the second boundary during the take-off, the landing, and the flight of the aircraft; and manufacturing the pressurization system comprising the first and second orifices having the further updated sizing and positioning.

BRIEF DESCRIPTION OF THE DRAWINGS

FIG. 7 illustrates locations where pressure taps and flowmeters are located on the fan duct inner wall during a laboratory test example.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

First Example: Pressurization System

Figure 2A:
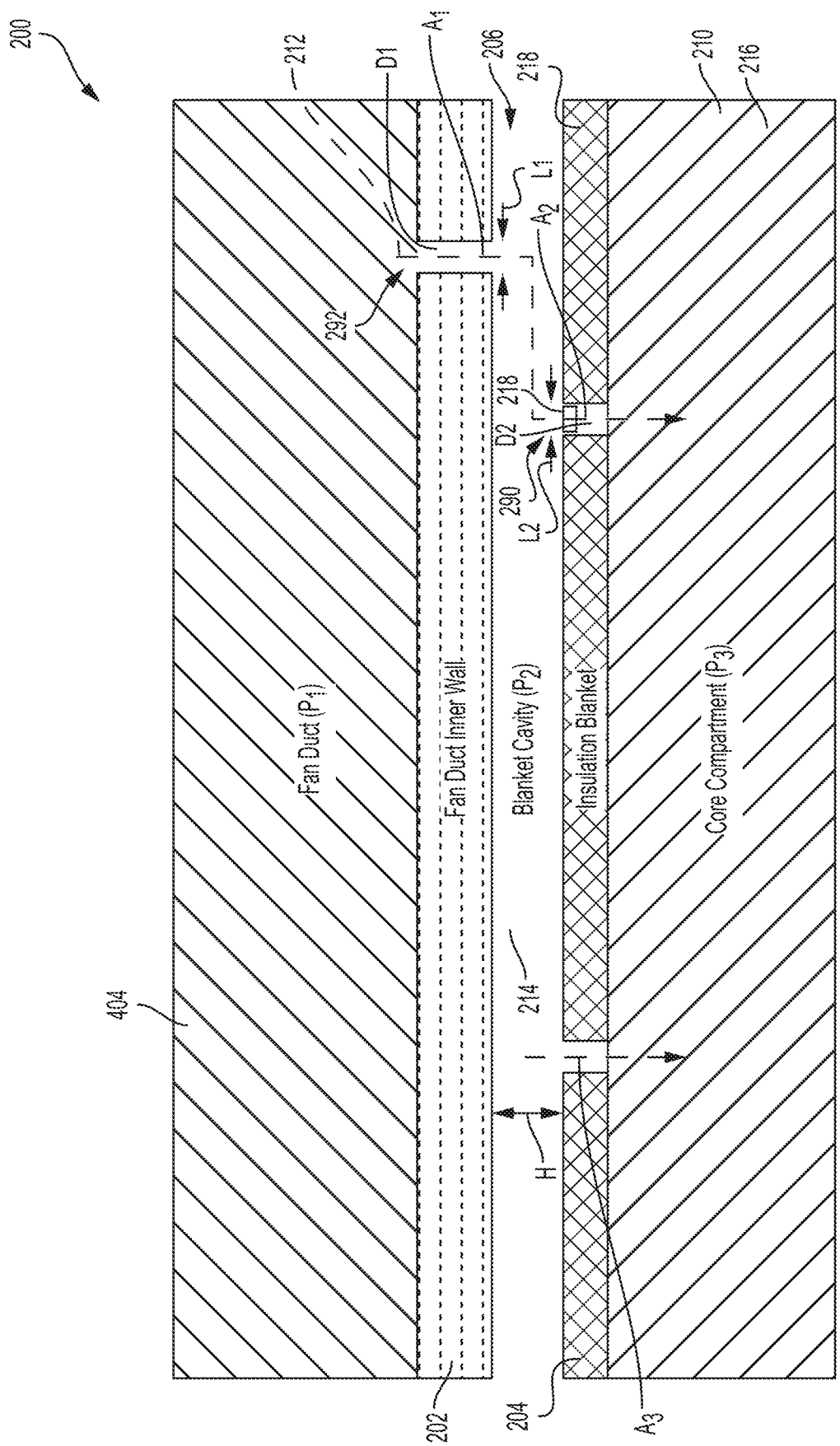
FIG. 2A illustrates an example pressurization system wherein a pressure P2 in a blanket cavity is a function of a first pressure P1 in a fan duct pressure, core compartment pressure (P3), inlet area (A1), exit area (A2), and leakage area (A3). A1 and A2 are sized such that P2>P3. This prevents air from flowing from core compartment to the blanket cavity.

FIG. 2A illustrates a pressurization system 200 including a fan duct inner wall 202 (e.g., comprising a composite material), an insulation blanket 204, and a cavity 206 (e.g., blanket cavity) between the fan duct inner wall 202 and the insulation blanket. The fan duct inner wall 202 includes a first orifice A1 through the inner wall 202 coupling a portion of the air flowing in the fan duct into the cavity. The insulation blanket 204 includes a second orifice A2 through the insulation blanket 204 that couples pressure in the cavity 206 to the core compartment 210 housing an engine core. A third orifice A3 represents undesirable leakage paths around or through the insulation blanket 204 and is not necessarily part of the pressurization system 200.

The first orifice A1 through the fan duct inner wall 202 allows air flow 212 from the fan duct 208 at a first pressure P1 to enter the blanket cavity 206 formed between the insulation blanket 204 and the fan duct inner wall 202. The airflow 212 forms a pressurization barrier 214 creating a second pressure P2 within the blanket cavity 206. The pressurization barrier 214 prevents flow or leakage of high-temperature air 216 from entering the blanket cavity 206 from the engine core compartment 210. To prevent or suppress the high-temperature air 216 from entering the blanket cavity 206, A1 and A2 are sized relative to one another to promote a pressure differential P2>P3, where P3 is the pressure in the engine core compartment.

The pressurization system 200 can compensate for unintended leak path(s) A3 that become too large, resulting in P2<P3 and causing hot air to flow from engine core compartment 210 into the blanket cavity.

Pressurizing the blanket cavity with high-pressure fan duct air also prevents hot core compartment air from flowing behind the thermal insulation blankets and damaging the inner wall. Leakage of hot air behind the blankets is caused by imperfect sealing design, manufacturing variability, and in-service damage.

In one or more examples, a valve (pressure sensitive valve PSV or pressure relief valve PRV) 218 is coupled the second orifice A2 to assist in maintaining the appropriate pressure differential P2>P3. The valve is biased to an open position as long as the P2 is greater than P3. However, as P3 approaches P2 or P2 drops (for example if there is leakage occurring at A3), the valve 218 begins to close (e.g., close off more area of the orifice A2) and restricts air flow through second orifice A2 until the predetermined pressure differential P2>P3 is reached. In various examples, the valve can regulate airflow through second orifice A2 such that P2>P3 for a larger range of P1, P3, and A3 values than would otherwise be possible. In one or more examples, valve 218 comprises a valve spring used to open and close the orifice A2, thereby controllably varying the area (290) of A2 or airflow through A2 to achieve the desired P2>P3 (e.g., so as to prevent or suppress thermal damage to inner wall 202 caused by the hotter air 216 in the core compartment 210).

Figure 2B:
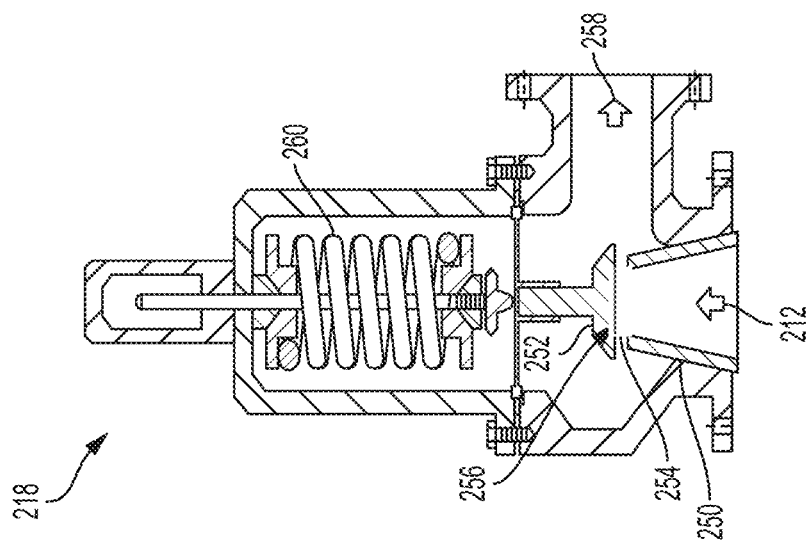
FIG. 2B illustrates an exemplary valve used in a pressurization system according to one or more embodiments.

FIG. 2B illustrates an example valve 218. The valve includes an inlet nozzle 250 in contact with pressure P2, a valve seat 252 controlling the area 254 of an opening 256 through the valve between the inlet nozzle 250 and an outlet 258 (comprising the second orifice A2), and a spring 260. The spring 260 counteracts the pressure P2 on the valve seat 252 such that the valve 218 is always in equilibrium. If the pressure P2 in the cavity 206 decreases, the spring 260 actuates the valve seat 252 to decrease the area 254 of the opening 256 through the valve so as to return to the valve 218 to equilibrium. If the pressure P2 in the cavity increases, the spring 260 actuates the valve seat 252 to increase the area 254 of the opening 256 and return the valve 218 to equilibrium. In one or more examples, the valve 218 is regulated and/or in equilibrium so that P2 in the cavity is greater than the pressure P3 in the core compartment during take-off, flight, and landing of an aircraft including the aircraft engine as well as optionally so that P2 is uniform across the inner surface 270 of the inner wall 202 and the inner surface 272 of the insulation blanket 204.

Second Example: Passive Cooling System

Figure 3A:
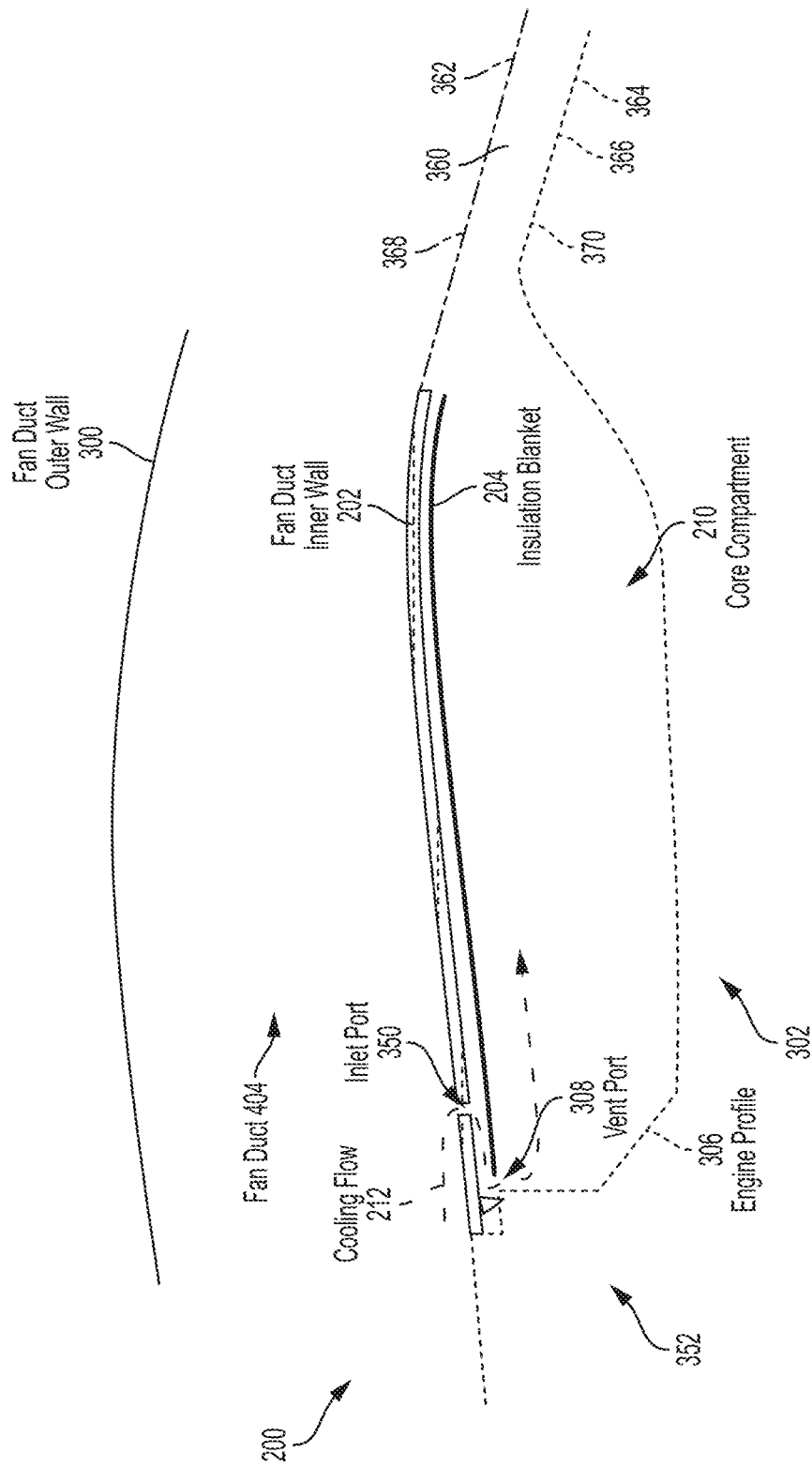
FIG. 3A illustrates a portion of a nacelle including the pressurization system combined with an engine core compartment passive cooling system including passive holes, according to one or more examples.
Figure 3B:
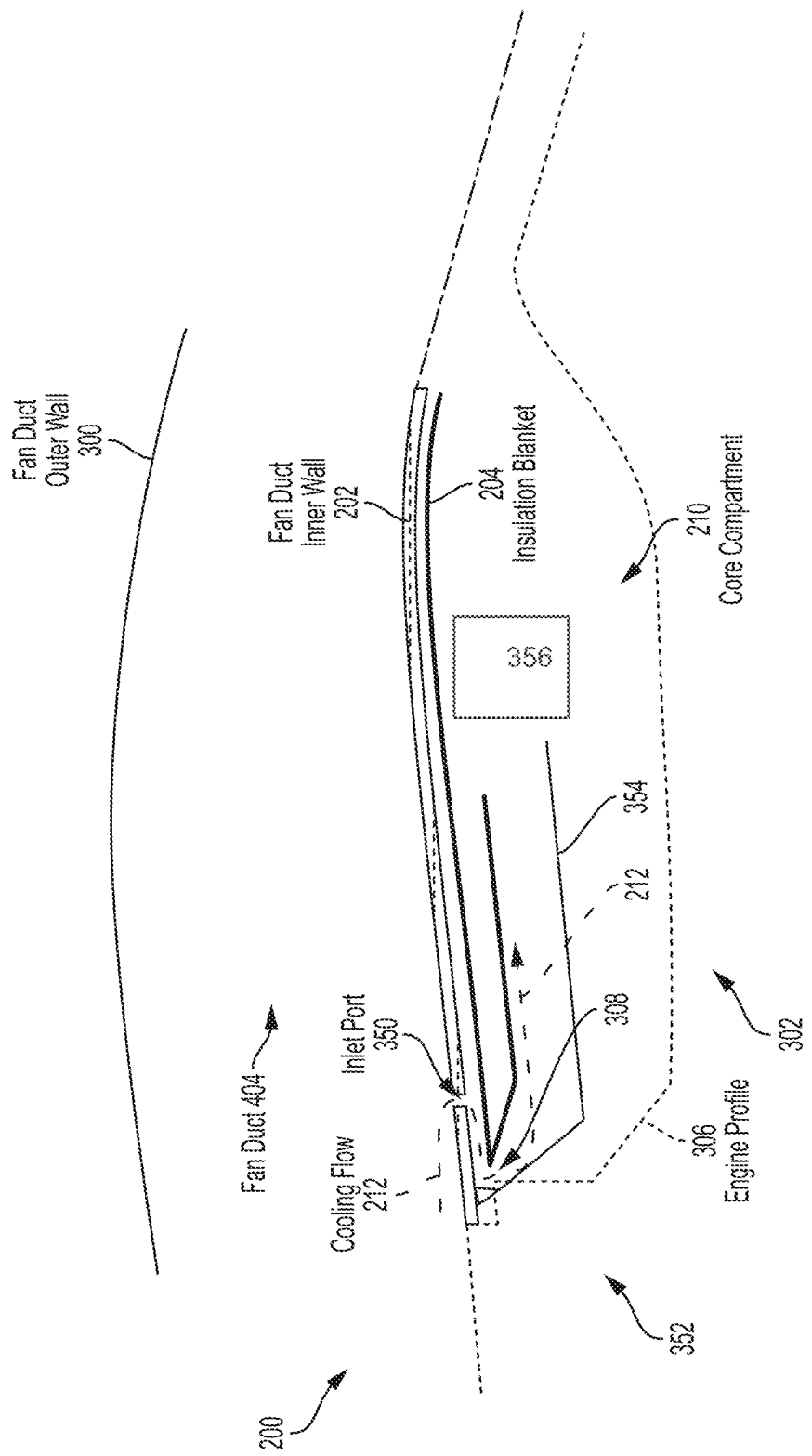
FIG. 3B illustrates the pressurization system combined with an engine core compartment passive cooling system including a tube, according to one or more examples.
Figure 3C:
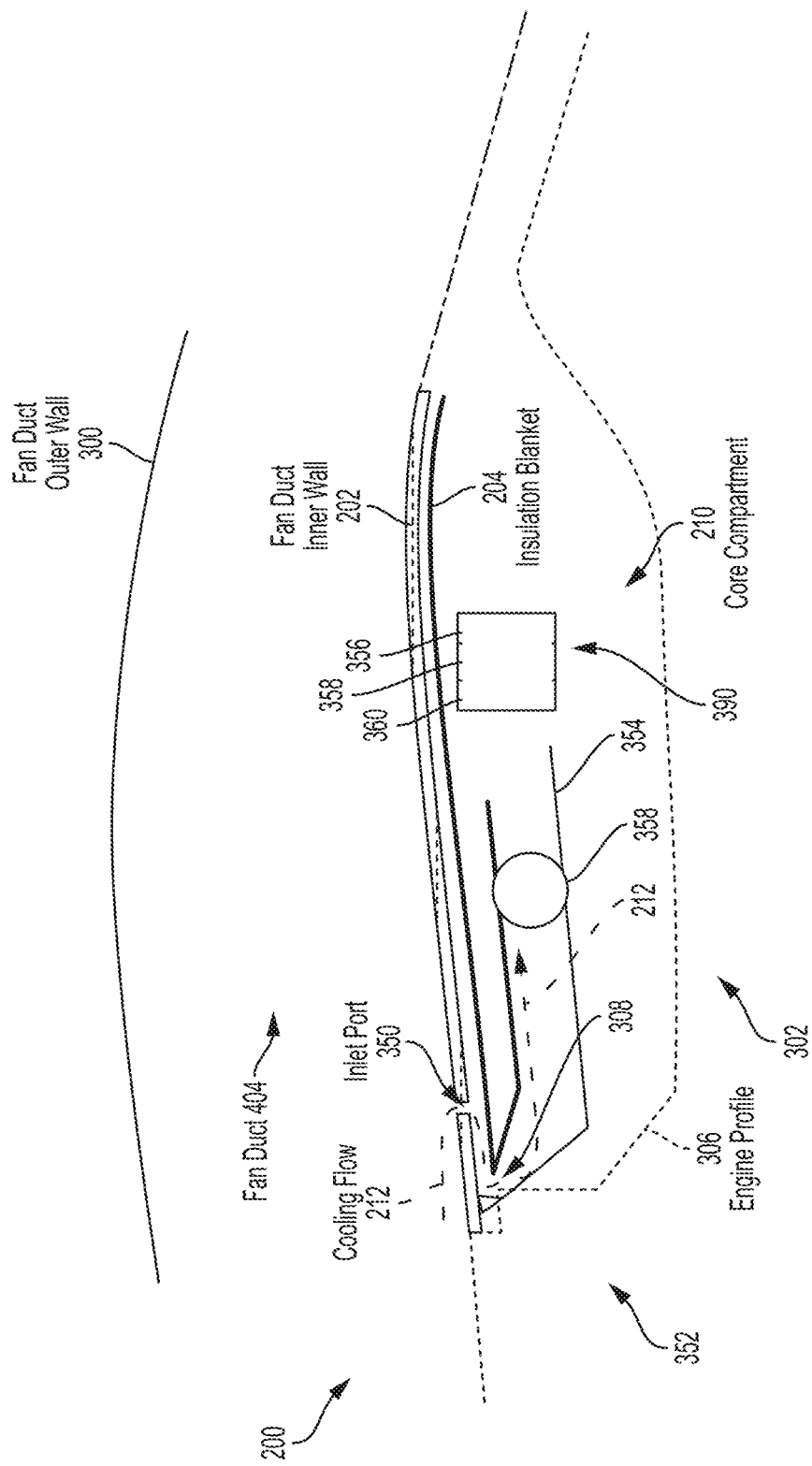
FIG. 3C illustrates the pressurization system combined with an engine core compartment passive cooling system including a tube and a valve connected to the tube, according to one or more examples.

The air flowing through second orifice A2 may be directed within, or exhausted directly into, the engine core compartment 210 so as to cool components in the engine core. FIGS. 3A-3C illustrate a portion of a nacelle 300 including the pressurization system 200 combined with an engine core compartment passive cooling system 302). Passive cooling is accomplished by increasing the mass flow rate of airflow 212 through a hole 350 (e.g., orifice A1) from pressurization system 200 to a level suitable for cooling of the engine core compartment 210 and/or components in the engine compartment.

The passive cooling can be implemented in at least three ways.

FIG. 3A illustrates an example including passive holes 308 (e.g., second orifice A2) in the insulation blanket 204 at the forward end 352 of the core compartment 210 allowing airflow 212 from the fan duct to enter and cool the core compartment as the air flows aft to the exit 360 of the core compartment 210. The exit 360 is formed between an aft cowl 362 attached to the aft end of the fan duct inner wall 202 and a cowl 364 attached to the aft end of the engine core 65. The aft cowl 362 and the cowl 364 may comprise metal cowls. The cowl 364 attached to the engine core 65 comprises an exhaust nozzle 366 and forms the inner flow surface 368 of the exit 360 from the core compartment 210. The aft cowl 362 forms the outer flow surface 370 of the exit 360 from the core compartment 210. In one or more examples, the aft cowl 362 is attached to a composite portion of the fan duct inner wall 202.

Also shown in FIG. 3A is an exemplary engine core casing profile 306.

FIG. 3B illustrates another example including passive tubes 354 delivering the airflow 212 from the fan duct to specific areas/components 356 in the core compartment 210 where dedicated cooling is required.

In both cases the examples of FIG. 3A and FIG. 3B the system is sized (i.e., tube 354 and hole 350 diameters are sized) for a critical case.

FIG. 3C illustrates an example including actively controlled cooling where a valve 358 regulates air flow, e.g., based on engine power setting. The control valve is usually integrated with a dedicated cooling tube network.

Figure 1:
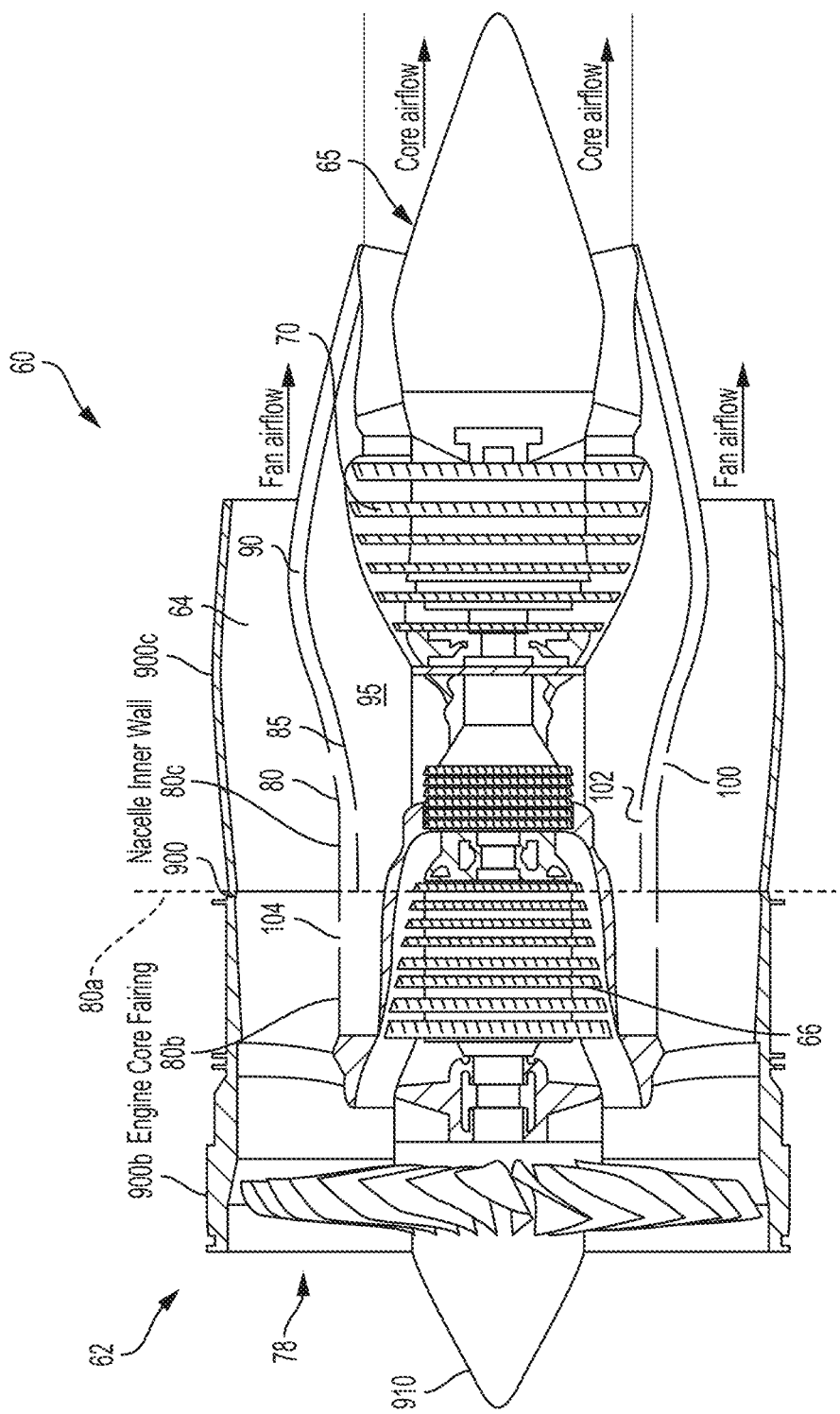
FIG. 1 is a schematic view of an aircraft engine and the portion of the nacelle which comprises the fan duct.

In contrast to the system illustrated in FIG. 1, the inlet orifice A1 and exit orifice A2 in the insulation blanket 204 are sized and located (e.g., exit orifice A2 is located in the insulation blanket 204 extending forward of dashed line 80a) such that the inlet orifice A1 and exit orifice A2 allow enough of the airflow 212 to flow into the core compartment 210 to provide a passive cooling benefit.

In one example, the inlet port 104 in the engine core fairing 80a can be eliminated because the passive cooling is provided by orifices A1, A2.

Third Example: Engine Installation

Figure 4A:
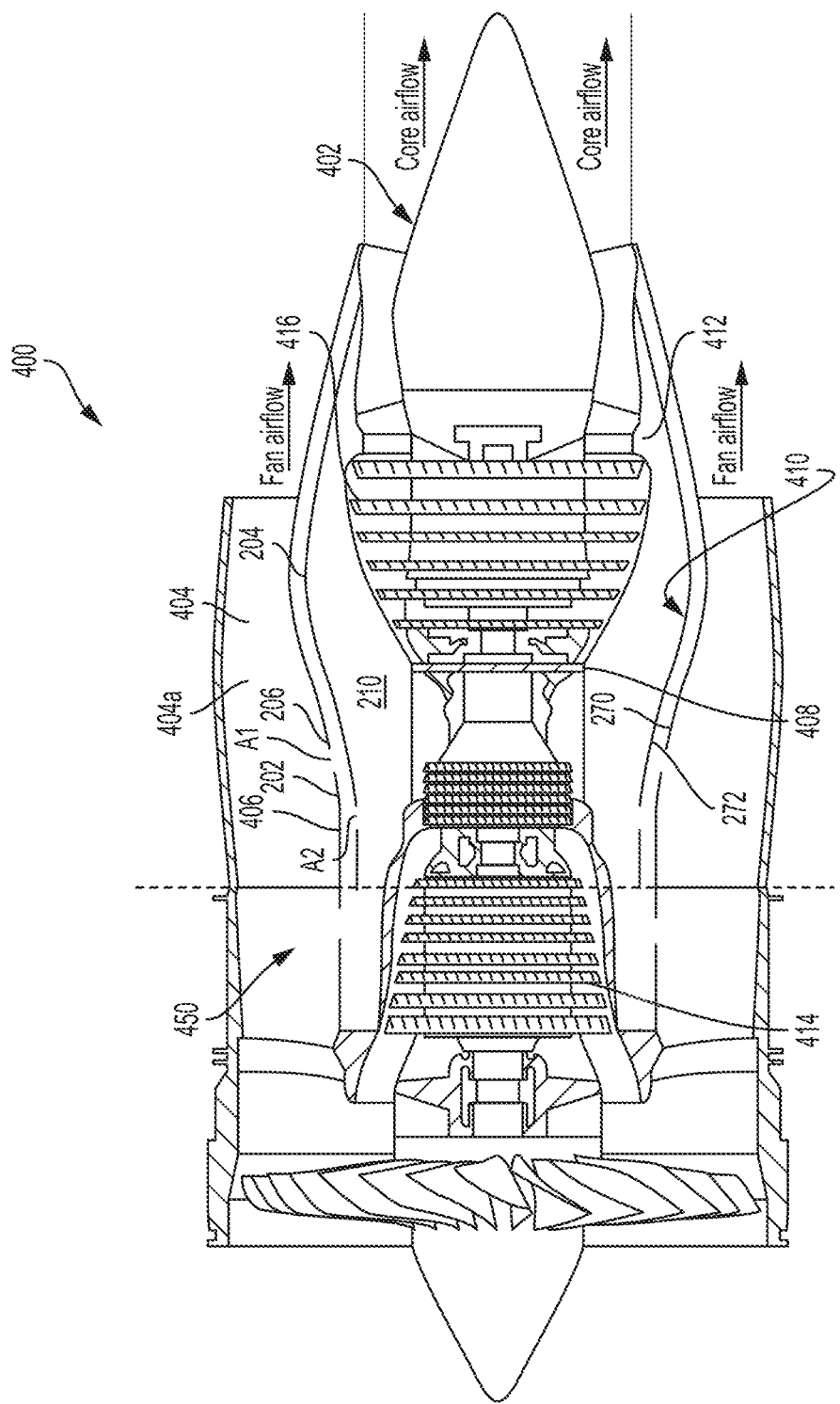
FIG. 4A illustrates an aircraft engine including a pressurization system and/or cooling system according to embodiments described herein.

FIG. 4A illustrates an aircraft engine 400 including a pressurization system 200 according to embodiments described herein. The engine comprises an engine core 402; a fan duct 404 including an inner wall 202; a first orifice A1 through the inner wall 202; an insulation blanket 204 coupled to the inner wall 202 so as to shield the inner wall 202 from heat generated in the engine core 402; a second orifice A2 through the insulation blanket 204; a blanket cavity 206 between the inner wall 202 and the insulation blanket 204, the cavity 206 receiving air 406 inputted into the cavity through the first orifice from the fan duct 404; a core compartment 210 within the fan duct and housing the engine core 402, the core compartment having a first boundary 408 with the engine core 402 and second boundary 410 with the insulation blanket 204; and a valve 218 coupled to the second orifice A2 and regulating flow of the air passing through the second orifice such that pressure P2 in the cavity exceeds pressure P3 in the core compartment. The pressure P2 suppresses flow of hotter air 412 from the core compartment into the cavity 206. Pressure P2 may be uniform within 10% across the inner surface 270 of the inner wall and the inner surface 272 of the insulation blanket.

In a passive cooling embodiment 302 combined with the pressurization system 200, the second orifice (A2) (which may or may not include a valve 218 and/or be connected to tube 354 as illustrated in FIGS. 3A-3C) at a forward end 352 of the core compartment (210) also allows/directs the air (406) from the fan duct (404) to enter the core compartment (210) and cool the core compartment (210) as the air (406) flows aft to the exit 360. Thus, the airflow 212 through the second orifice A2 can also be used to cool the overall temperature in the core compartment 210 or components 356 (such as a valve 358 or sensor 360) in the core compartment 210 at a predetermined location 390 to improve performance and prevent failure of the components 356.

The configuration of valve 218, sizing and distribution of orifices A1, A2 may be such that:

pressure P2>P3 and is optionally uniform within 10% across the inner surface 270 of the inner wall 202 and the inner surface 272 of the insulation blanket 204 (e.g., resulting in prevention or suppression of thermal damage to inner wall 202, caused by the hotter air 412, that is more uniform and more effective over a variety of flight conditions, e.g., flight, take-off, and landing); and/or effective cooling of predetermined locations 390 in the core compartment 210 using airflow 212 is achieved.

Figure 4B:
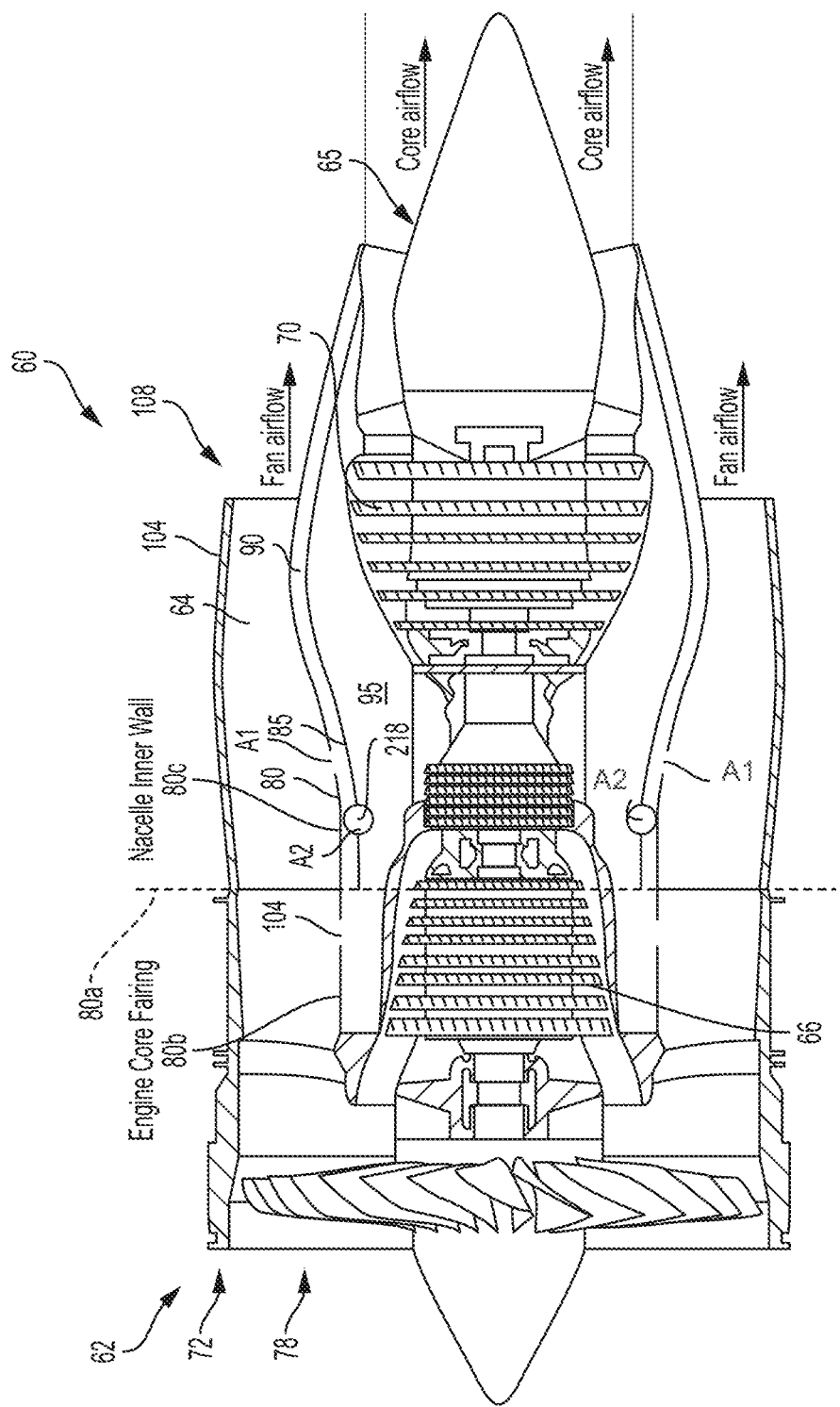
FIG. 4B illustrates an aircraft engine including a pressurization system including a valve, according to one or more embodiments.

FIG. 4B illustrates coupling a valve 218 to output port (second orifice A2) in the nacelle inner wall 80c to improve the pressurization system 200 performance in the nacelle thrust reverser 108 and prevent thermal damage to the nacelle inner wall 80c caused by hotter air (412). In one or more examples, the first orifice (A1) is in a nacelle inner wall (80c) that is part of a nacelle thrust reverser (108).

Process Steps

Designing a Backside Pressurization System

Figure 5:
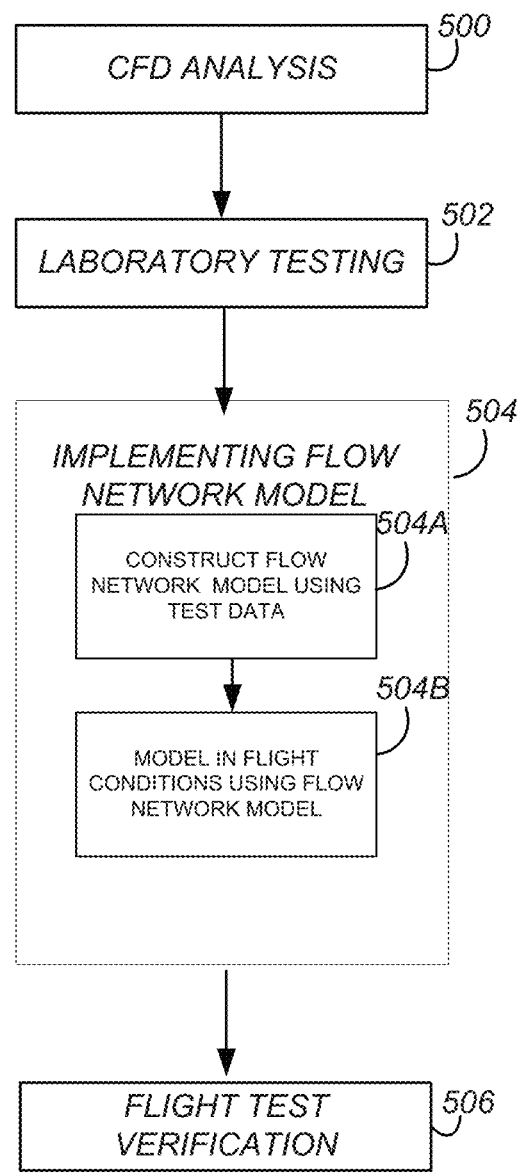
FIG. 5 is a flowchart illustrating a method of designing a backside pressurization system.

FIG. 5 is a flowchart illustrating a method of designing a backside pressurization system.

Block 500 represents performing a Computational Fluid Dynamics (CFD) Analysis estimating/determining:

a. flow rate required for adequate pressurization, and associated inlet port/orifice A1 and outlet port/orifice A2 initial sizing;

b. expected pressure drop between inlets (first orifice A1) and outlets (second orifice A2);

c. blanket-to-wall gap size (H) to ensure overall feasibility of the system.

In various examples, Navier Stokes equations are used to determine the pressure in the cavity as a function of size of the orifices A1, A2 used for the inlets and outlets, respectively, positioning of the orifices, and size of the gap.

Figure 6:
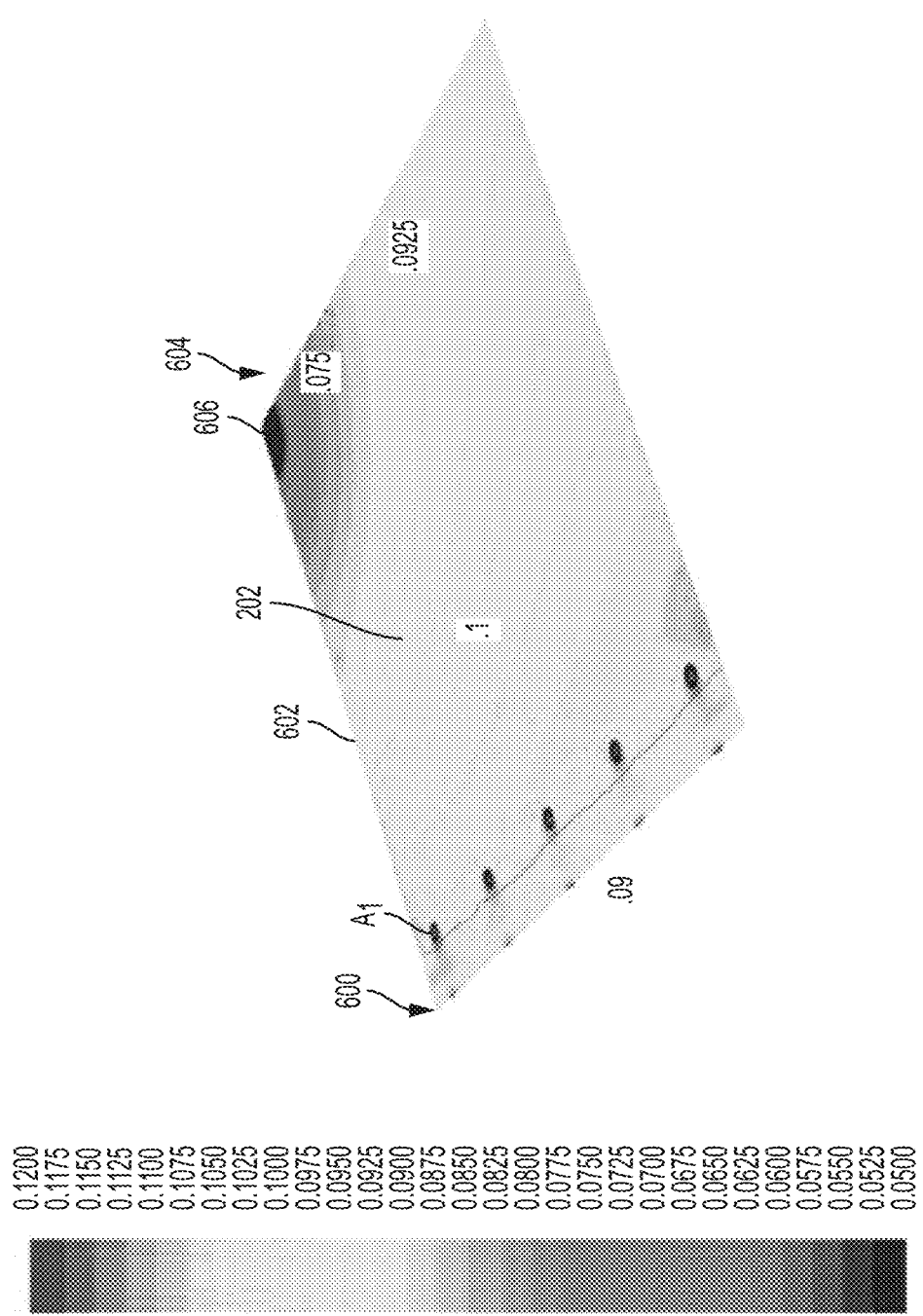
FIG. 6 plots the pressure as a function of position across the fan duct inner wall, as determined using a computational fluid dynamics analysis according to one or more examples.

FIG. 6 illustrates exemplary results, plotting the pressure as a function of position across the fan duct inner wall. The results show uniform pressure with P2>P3 is achieved using 5 orifices A1 (also known as inlets) evenly distributed at a forward end 600 of the fan duct inner wall 202 and with an additional inlet orifice A1 602 between the forward end 600 and an aft end 604 of inner wall 202. The extra inlet orifice 602 is at a position on the base of the inner wall at a same vertical height on the inner wall as a drain 606 in the inner wall 202 used to drain undesirable fluids (such as oil) from the cavity.

Block 502 represents performing a laboratory test using and positioning instrumentation (pressure taps and flow meters) to map out the pressure distribution and quantify effects of installation. Under-blanket pressure tap locations are selected with all potential test configurations in mind (inlet locations, outlet locations, leakage locations, local geometry contours). Pressure taps are able to capture the local changes in pressure distribution that would result from different air flow patterns. FIG. 7 illustrates exemplary locations where pressure taps 700 and flowmeters can be located on the fan duct inner wall 202 for the laboratory test. Orifices A1 are also shown.

The laboratory testing runs a test matrix of inlet (orifice A1) and outlet (orifice A2) configurations with a sweep of inlet flow rates that cover expected in flight ranges. Favorable configurations will demonstrate more uniform pressures under the blanket in the cavity, and meet maximum pressure and flow targets. Since a seal leakage may develop over time, a uniform under-blanket pressure is important to make sure that potential leakage locations will not act as inlets (if the blanket cavity has a localized low pressure and a leak occurs there, hot air from the core could flow in).

Block 504 represents implementing a flow network model to test and/or model the data obtained from the laboratory test, update design sizing, simulate flight boundary conditions, and determine final sizing of the inlet orifice A1 and outlet orifice(s) A2.

Based on pressures obtained in the testing (Block 502), the step may determine a number of compartments required to capture the pressure gradients in a pressure flow network model.

Block 504A represents modeling/constructing the under-blanket flow network starting with measured inlet flow rates into orifice A1 and outlet geometric areas of orifice A2 measured in the laboratory test. The outlet discharge coefficients and effective areas between adjacent cavities or localized compartments are then adjusted to match the under-blanket pressure distribution in the cavity. A well correlated model is able to match results for a variety of inlet (A1) and outlet (A2) configurations.

Block 504B represents modeling the in-flight conditions using the flow network model (e.g., using 1D flow equations). The inlet (A1) is modeled with a boundary pressure instead of a controlled flow rate. Outlets (A2) are modeled with predicted boundary pressures. The step further comprises modeling conditions that are expected to yield minimum/maximum underblanket pressures in the cavity. Such in flight modeling is important because high altitude flight conditions are not well approximated by a laboratory test.

Figure 8B:
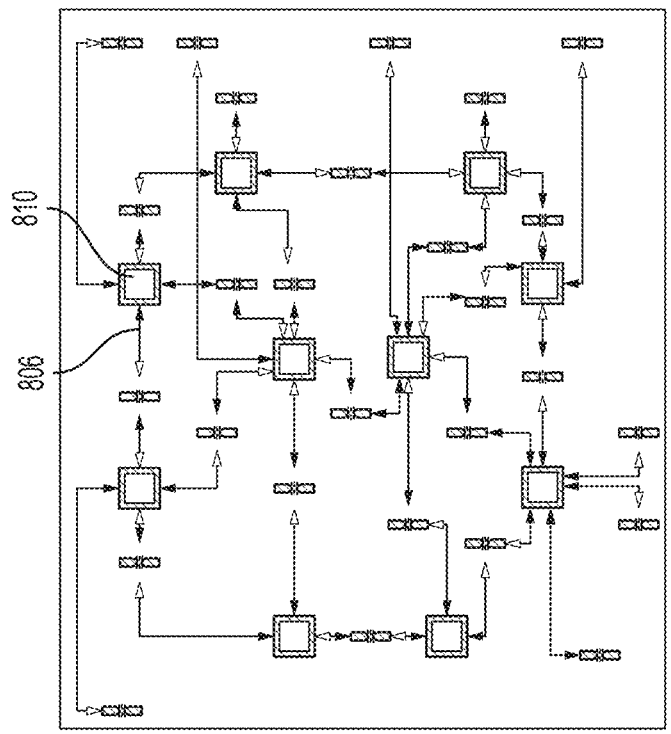
FIG. 8B illustrates a flow network model used to model the pressure distribution in the cavity, showing inputs to and outputs from nodes.
Figure 8A:
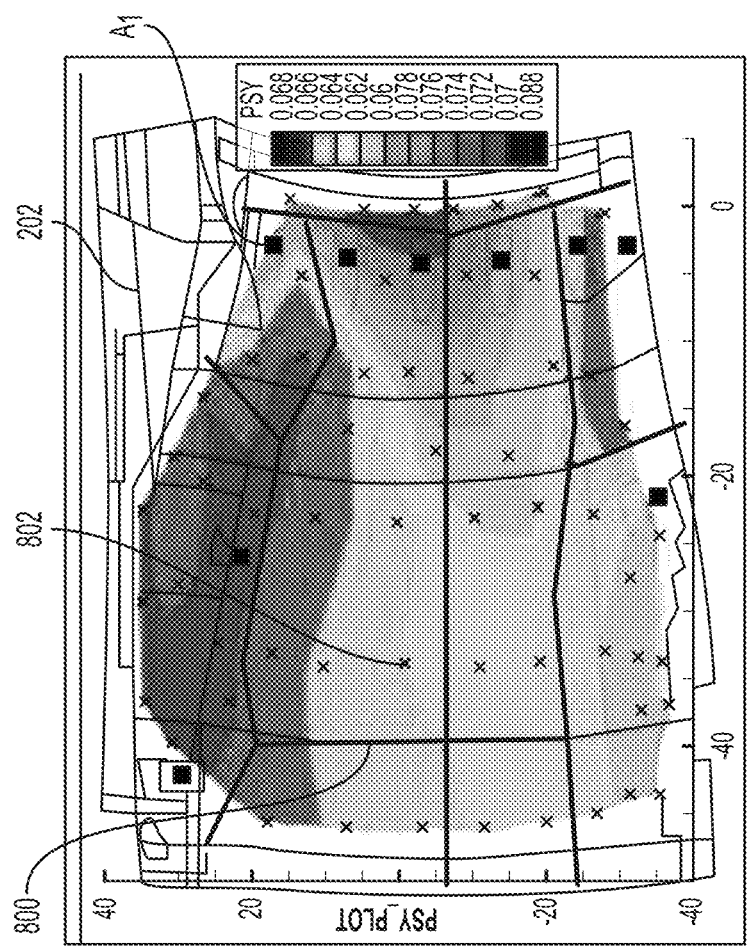
FIG. 8A is a schematic of the fan duct inner wall divided into compartments and illustrating locations of pressure taps and orifices A1.

FIG. 8A is a schematic of the fan duct inner wall divided into compartments 800 and illustrating locations of pressure taps 802 and orifices A1. FIG. 8B illustrates a flow network model 804 used to model the pressure distribution in the cavity 206, showing inputs 806 to and outputs 808 from nodes 810. The nodes 810 represent pressure at different locations on the fan duct inner wall 202. The different inputs 806 include measured inlet flow rates (ideal and actual) through A1, geometrical areas of the outlet orifice A2, in flight boundary conditions (e.g., boundary pressure and corresponding temperature depending on altitude of aircraft), air flow from adjacent nodes 810 (ideal and actual), and discharge coefficients. The outputs 808 include air flow rate to adjacent nodes and compartments 800.

Figure 9:
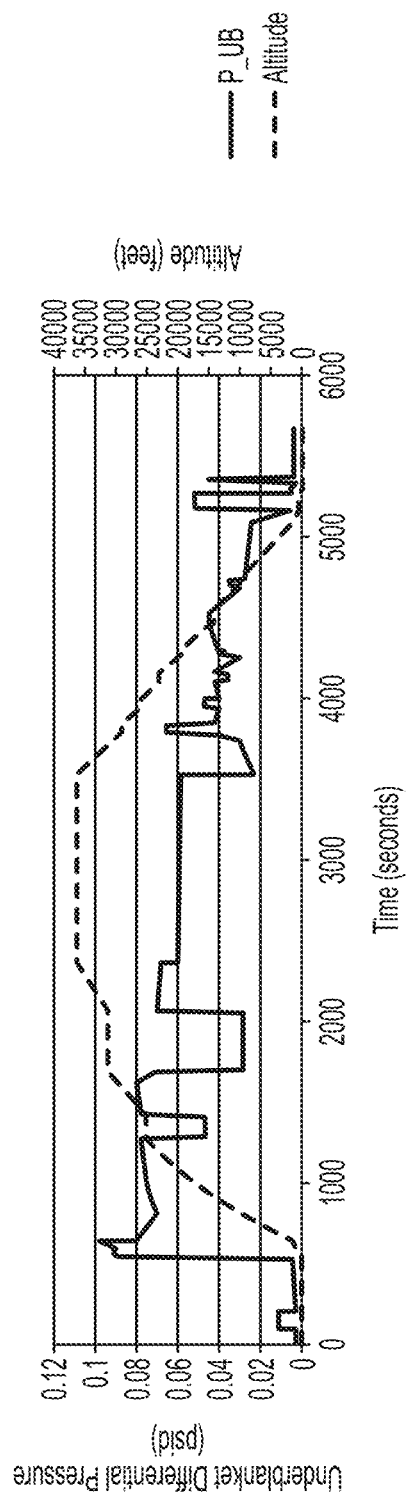
FIG. 9 illustrates results of flow network modeling according to one or more examples, showing how cavity pressure changes as a function of time (in seconds) throughout the flight (and altitude of the aircraft).

FIG. 9 illustrates the results of the flow network modeling, showing how cavity pressure changes as a function of time (in seconds) throughout the flight (and altitude of the aircraft powered by the engine including the pressurization system). The model can be used to select orifice positioning and geometric area to accommodate a variety of flight conditions (e.g., altitude, engine thrust).

Block 506 represents flight test verification using pressure instrumentation that verifies boundary pressures used in the flow network model. The verification is also used to confirm that the pressurization system works as expected. The pressurization system can be tested over a range of flight conditions, including conditions with high core compartment pressure.

Figure 10:
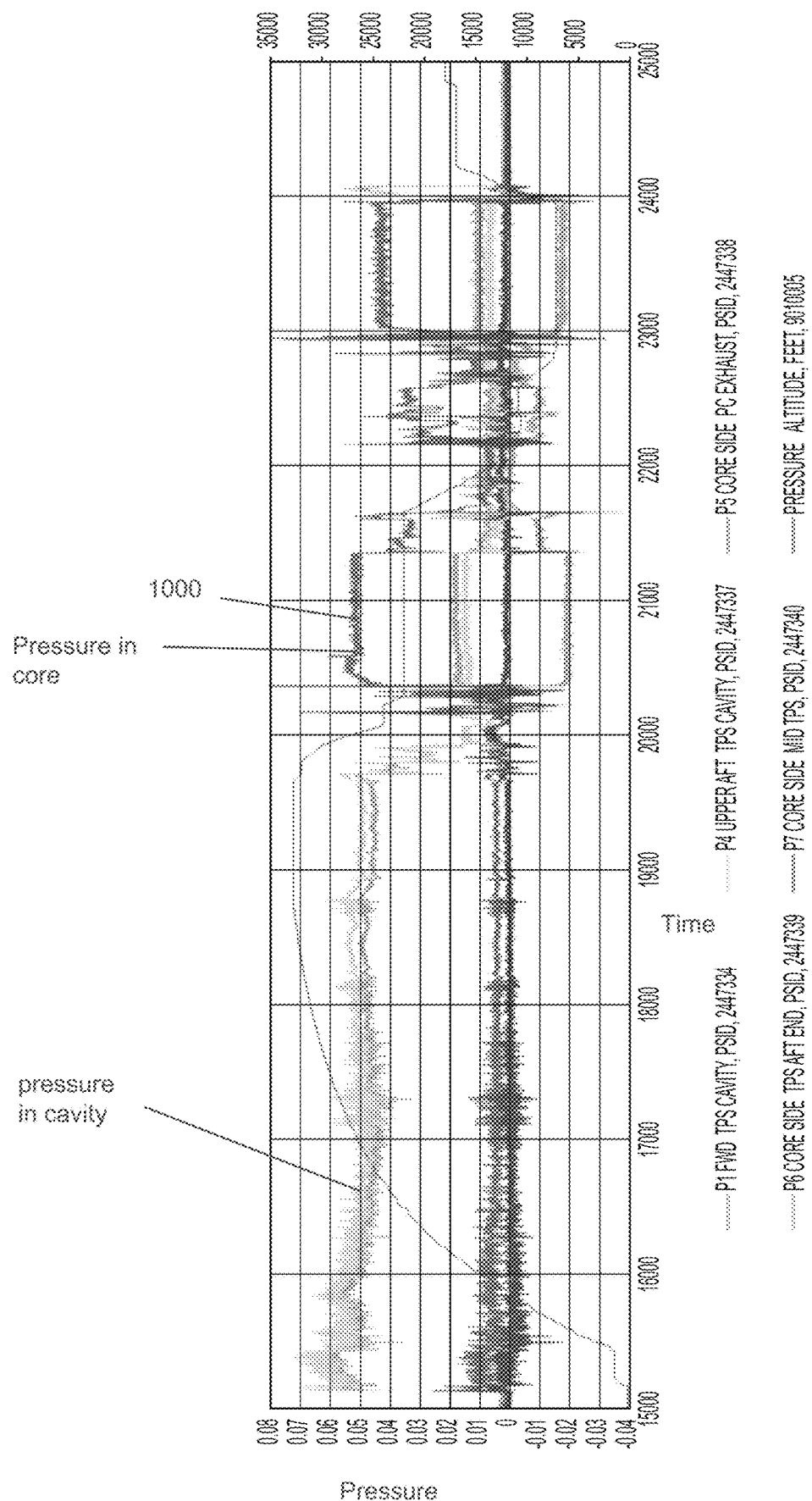
FIG. 10 illustrates measured pressure in the cavity and the engine core as a function of flight condition as represented by time during the flight, without the pressurization system described herein.

FIG. 10 illustrates measured pressure in the cavity and the engine core as a function of flight condition as represented by time during the flight, without the pressurization system that utilizes a pressure-regulating valve for orifice A2. The data shows that the core pressure P3 exceeds the cavity pressure P2 during some portions 1000 of the flight. Implementation of the pressurization system according to embodiments described herein can ensure P2 exceeds P3 at all times during the flight.

In one or more embodiments the areas and locations of orifices A1 are A2 are selected such that the pressure P2 in the cavity is uniform (within 10%) across the entire fan duct inner wall and/or such that P2 exceeds P3 by at least 0.1 pounds per square inch. In one or more examples, A1 has an area 290 that is smaller than the area 292 of A2. In one or more examples, the first orifice A1 has a first surface area 290 transmitting the air 406, the second orifice A2 has a second surface area (292) transmitting the air 406, and the first surface area 290 is smaller than the second surface area 292 (the first orifice can be smaller since the pressure drop (and pressure ratio) is greater across the first orifice than the second orifice; the first orifice regulates the flow and the second orifice regulates the under-blanket pressure).

Example dimensions for orifice A1 include, but are not limited to, diameters or sides having a length L1 in a range of 0.1-0.5 inches (e.g. 0.25 inches). Example dimensions for orifice A2 include, but are not limited to, diameters or sides having a length L2 in a range of 0.5-1.5 inches (e.g. 1 inch). In one or more examples, between 3-20 orifices A1 are provided and between 1-20 (e.g. 1-5) orifices A2 are provided. Such lengths L1, L2, areas 290, 292, number of ports or orifice A1, A2, and positioning of ports or orifices A1, A2 as described herein may enable the pressure P2 in the cavity (206) to exceed P3, enable P2 to be uniform to within 10% across the (e.g., entire) inner surface (270) of the inner wall (202) and the (e.g., entire) inner surface (272) of the insulation blanket (206) so as to more effectively prevent or suppress thermal damage of the inner wall 202 caused by hotter air (412) from the core compartment (210), and/or provide airflow 212 into the core compartment for cooling of predetermined locations (390) within the core compartment (210), over a wide range of flight conditions (e.g., take-off, flight, and/or landing).

Fabrication

Figure 11:
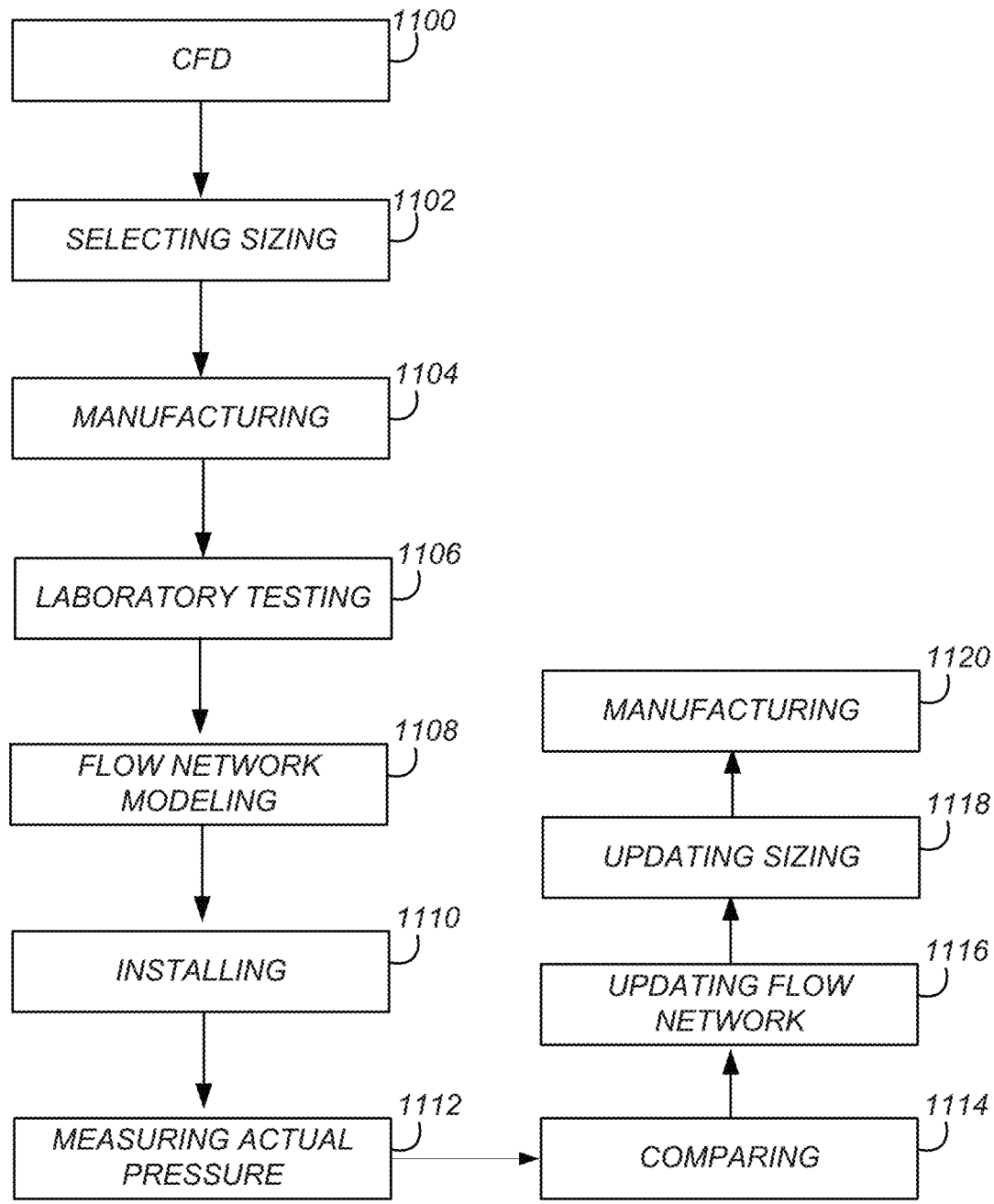
FIG. 11 is a flowchart illustrating a method of making a pressurization system according to one or more embodiments.

FIG. 11 is a flowchart illustrating a method of making a pressurization system comprising determining sizing and positioning of a first orifice and a second orifice (A2) in a pressurization system in an aircraft engine (400) as illustrated in, and described with reference to, FIG. 4, using an iterative process including computational fluid dynamics analysis, flow network modeling, laboratory testing, and flight testing.

Block 1100 represents performing the CFD) analysis, wherein the CFD analysis determines pressure in the cavity (206) as a function of size (e.g., D1) of the first orifice (A1), size (e.g., D2) of the second orifice (A2), height of the cavity (206), and the positioning of the first orifice (A1) and the second orifice (A2).

Block 1102 represents selecting the height H of the cavity (206) (or blanket-to-wall gap), the size (e.g. D1) of the first orifice, the size (e.g., D2) of the second orifice (A2), and the positioning of the first orifice A1 and the second orifice (A2 such that the pressure P2 in the cavity (206) exceeds pressure P3 in the core compartment (210) according to the CFD analysis.

Block 1104 represents manufacturing the pressurization system having the height, the size of the first orifice (A1), the size of the second orifice (A2), and positioning of the first orifice (A1) and the second orifice (A2) selected in Block 1102.

Block 1106 represents performing the laboratory testing measuring pressure distribution, including initial pressure boundary conditions, in the pressurization system manufactured in step (c) for a plurality of airflow rates in the fan duct (404) encountered during the flight, the take-off, and the landing of the aircraft powered by the aircraft engine (400).

Block 1108 represents performing the flow network modeling, comprising (i) constructing a flow network model modeling the pressure distribution as a function of altitude of the aircraft and engine thrust of the aircraft engine (400), using the initial pressure boundary conditions; and (ii) using the flow network model to obtain updated sizing and positioning of the first orifice (A1) and the second orifice (A2) that achieve the pressure P2 in the cavity (206) that exceeds the pressure P3 in the core compartment (210) when the pressurization system is installed in the aircraft engine (400) on the aircraft, wherein the pressure is uniform within 10% across the first boundary (408) and the second boundary (410) during the take-off, the flight, and the landing of the aircraft.

Block 1110 represents installing the pressurization system comprising the first orifice (A1) and second orifice (A2) having the updated sizing and positioning, in the aircraft engine (400) on the aircraft.

Block 1112 represents measuring actual pressure distribution and actual boundary conditions in the pressurization system installed in the aircraft engine (400) on the aircraft so as to determine whether, at all times during the take-off, the landing, and the flight of the aircraft (1) the pressure P2 in the cavity (206) exceeds the pressure P3 in the core compartment (210), and (2) the pressure P2 in the cavity (206) is uniform within 10% across the first boundary (408) and the second boundary (410).

Block 1114 represents comparing the actual pressure distribution with the pressure distribution modeled using the flow network model.

Block 1116 represents updating the flow network model using the actual boundary conditions that are different from the initial boundary conditions, so as to form an updated flow network model.

Block 1118 represents using the updated flow network model to obtain further updated sizing and positioning of the first orifice (A1) and the second orifice (A2) that achieve the pressure P2 in the cavity (206) that exceeds the pressure P3 in the core compartment (210) when the pressurization system is installed in the aircraft engine (400), wherein the pressure is uniform within 10% across the first boundary (408) and the second boundary (410) during the take-off, the landing, and the flight of the aircraft.

Block 1120 represents manufacturing the pressurization system comprising the first orifice (A1) and second orifice (A2) having (e.g., the further updated) sizing and positioning. The sizing and positioning are such that pressure P2 in the cavity (206) exceeds pressure P3 in the core compartment (210), the pressure P2 suppressing flow of hotter air (412) from the core compartment (210) into the cavity (206), at all times during take-off, landing, and flight of the aircraft powered by the aircraft engine (400).

Operation

Figure 12:
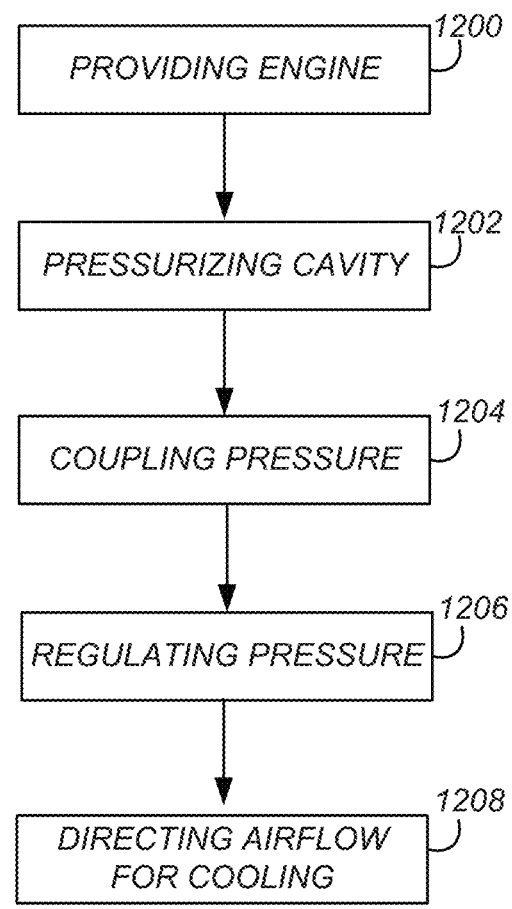
FIG. 12 is a flowchart illustrating a method of operating a pressurization system according to one or more embodiments.

FIG. 12 is a flowchart illustrating a method of operating a pressurization system so as to regulate pressures and temperatures within an aircraft engine as illustrated in FIG. 4.

Block 1200 represents providing or obtaining an aircraft engine (e.g., as illustrated in, and described with reference, to FIG. 4) (comprising a fan duct including an inner wall for directing an airflow along the aircraft engine; a core compartment within the duct for housing the aircraft engine; an insulation blanket disposed between the fan duct and the core compartment; and a cavity formed between the inner wall of the fan duct and the insulation blanket. A first orifice is provided through the inner wall for directing airflow from the duct to the cavity. A second orifice is provided through the insulation blanket for directing airflow in to the inner compartment.

Block 1202 represents pressurizing the cavity formed between the inner wall of the fan duct and an insulation blanket. The cavity is pressurized using high-pressure air flowing through the fan duct and coupled through orifice A1 into the cavity, creating a pressurization barrier in the cavity.

Block 1204 represents coupling the pressure P2 to the core compartment (210) through the second orifice (A2).

In this way, the pressurization barrier can be used to ensure that the pressure within a cavity formed between the inner wall of the fan duct and the insulation blanket exceeds the pressure within the core (engine) compartment, thereby preventing leakage of extremely high-temperature air from within the engine compartment into the cavity.

This pressurization barrier helps to prevent the extremely high-temperature air in the engine compartment from by-passing seals along the insulation blanket. If allowed to leak into the cavity, the high-temperature air would damage the inner wall of the fan duct and other surrounding structures.

Block 1206 represents regulating and/or maintaining the pressure P2 within the cavity (206) so that the pressure P2 in the cavity (206) exceeds a pressure P3 in the core compartment (210) and suppresses flow of hotter air (412) from the core compartment (210) into the cavity (206), e.g., in a uniform manner and/or during various times during flight. The pressure may be consistent or uniform throughout the cavity. As illustrated herein, pressure is maintained by appropriate sizing of an orifice A1 in the inner wall (for allowing air flow in to the cavity) relative to the area of an orifice A2 through the insulation blanket (for allowing air flow out of to the cavity). The sizing of the orifice A2 can be varied using a valve coupled to the second orifice, so that regulating flow of the portion of the air (404a) through the second orifice (A2) into the core compartment (210) uses the valve (218) to control the pressure P2.

Block 1208 represents optionally directing a portion of the air (404a) through the second orifice (A2) into the core compartment (210). The airflow 212 from/exiting the cavity can be directed into the engine compartment so that the airflow (212) blows over predetermined components or areas/locations 390 within the core compartment for the purpose of cooling those components. Thus, a common airflow can be used to both pressurize the cavity and cool components in the engine compartment or core. In one or more examples, increasing the pressurization flow through the second orifice A2 and exhausting the flow into the front of the core compartment means that a dedicated core compartment cooling system is not needed.

Advantages and Improvements

The nacelle fan duct inner wall is protected from heat damage by thermal insulation blankets. These insulation blankets are sealed on all edges to prevent hot air from leaking past the blankets and damaging the inner wall. Some engine architectures require inlet ports to penetrate through the inner wall and thermal insulation blanket to allow pressurized air from the fan duct to enter into and cool the core compartment. These penetrations pose a risk for hot air to leak past the insulation blankets and damage the inner wall. Embodiments disclosed herein eliminate the need for dedicated core compartment barrier cooling inlet ports by combining a cooling system with a pressurization system. Eliminating the dedicated core compartment cooling system provides a cost savings.

Another novel feature described herein is to utilize pressure relief valves (PRV) to regulate the under-blanket cavity pressure. The PRVs can passively adjust the system exit area to regulate under-blanket pressure to the ideal condition for the entire flight envelope. The system is also able to counteract damage to the insulation blanket seals because the resulting pressure drop from the damage would cause the PRV to decrease exit area such that the system pressure returns to the nominal condition.

While the embodiments described herein are illustrated in the context of aircraft engines, the pressurization system and/or cooling system can be implemented in a variety of applications including, but not limited to, general engines and thrust reversers.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft engine, comprising:
   an engine core comprising a compressor and a turbine;
   a fan duct including an inner wall extending along a length of a region between the compressor and the turbine;
   a first orifice through the inner wall;
   an insulation blanket coupled to the inner wall so as to shield the inner wall from heat generated in the engine core, the insulation blanket extending along the length;
   a second orifice through the insulation blanket;
   a cavity bounded by the inner wall and the insulation blanket and extending between the inner wall and the insulation blanket along the length, the cavity receiving air inputted into the cavity through the first orifice from the fan duct wherein at least a portion of each of the cavity and thermal blanket are located aft of a turbine blade of the turbine;
   a core compartment within the fan duct and housing the engine core, the core compartment having a first boundary with the engine core and second boundary with the insulation blanket; and
   a valve coupled to the second orifice and regulating flow of the air passing through the second orifice such that:
   a first pressure in the cavity exceeds a second pressure in the core compartment, the first pressure suppressing flow of hotter air from the core compartment into the cavity.

2. The aircraft engine of claim 1, wherein the valve is a pressure relief valve controlling an area of the second orifice so that first pressure in the cavity is greater than the second pressure in the core compartment during take-off, flight, landing of an aircraft including the aircraft engine, or so as to prevent or compensate for the second pressure exceeding the first pressure caused by at least one of: a flight condition, or an unintended leak between the core compartment and the cavity causing the flow of hotter air into the cavity.

3. The aircraft engine of claim 1, wherein the valve includes a spring coupled to a valve seat, the spring counteracting the first pressure on the valve seat such that the valve is always in equilibrium.

4. The aircraft engine of claim 3, wherein:
   if the first pressure in the cavity decreases, the spring actuates the valve seat to decrease an area of an opening through the valve so as to return the valve to equilibrium, and
   if the first pressure in the cavity increases, the spring actuates the valve seat to increase the area of the opening through the valve to return the valve to equilibrium.

5. The aircraft engine of claim 1, wherein the valve controls an area of the second orifice so that the first pressure in the cavity is uniform to within 10% across an inner surface of the inner wall and an inner surface of the insulation blanket.

6. The aircraft engine of claim 5, wherein the inner wall includes 3-20 first orifices and the insulation blanket includes 1-20 second orifices distributed so that the first pressure is uniform to within 10% across an inner surface of the inner wall and an inner surface of the insulation blanket.

7. The aircraft engine of claim 1, wherein the first orifice has a first surface area transmitting the air, the second orifice has a second surface area transmitting the air, and the first surface area is smaller than the second surface area.

8. The aircraft engine of claim 1, wherein the first orifice has a diameter D1 having a length L1 in a range of 0.1-0.5 inches and the second orifice (A2) has a diameter D2 having a length L2 in a range of 0.5-1.5 inches.

9. The aircraft engine of claim 1, wherein: the second orifice is positioned to direct the air through the second orifice to a predetermined location on the first boundary that is thermally coupled to a component in the engine core, the air impinging at the predetermined location cools the component.

10. The aircraft engine of claim 9, wherein the component is a sensor or an additional valve in the core compartment.

11. The aircraft engine of claim 1, wherein the first orifice is in the inner wall that is part of a nacelle thrust reverser.

12. An aircraft engine, comprising:
an engine core comprising a compressor and a turbine;
a fan duct including an inner wall;
a first orifice through the inner wall;
an insulation blanket coupled to the inner wall so as to shield the inner wall from heat generated in the engine core;
a second orifice through the insulation blanket;
a cavity bounded by the inner wall and the insulation blanket, the cavity receiving the air inputted into the cavity through the first orifice from the fan duct wherein at least a portion of each of the cavity and thermal blanket are located aft of a turbine blade of the turbine;
a core compartment within the fan duct and housing the engine core, the core compartment having a first boundary with the engine core and second boundary with the insulation blanket; and
the second orifice in the insulation blanket at a forward end of the core compartment allows the air from the fan duct to enter the core compartment and cool the core compartment as the air flows aft to an exit.

13. The aircraft engine of claim 12, further comprising a tube connected to the second orifice, the tube delivering the air to a predetermined location or component in the core compartment where dedicated cooling is required.

14. The aircraft engine of claim 13, further comprising a valve connected to the tube, wherein the valve regulates flow of the air in the tube.

15. The aircraft engine of claim 14, further comprising a second valve coupled to the second orifice and regulating flow of the air passing through the second orifice such that:
a first pressure in the cavity exceeds a second pressure in the core compartment, the first pressure suppressing flow of hotter air from the core compartment into the cavity, and
the air from the fan duct enters the core compartment and cools the core compartment as the air flows aft to the exit.

16. A method of making an aircraft engine, comprising: providing an aircraft engine including:
a fan duct including an inner wall for directing air around an engine core, the engine core comprising a compressor and a turbine and the inner wall extending along a length of a region between the compressor and the turbine;
a core compartment within the fan duct for housing the engine core, the core compartment having a first boundary with the engine core;
an insulation blanket coupled to the inner wall and between the fan duct and the core compartment for shielding the inner wall from heat generated in the engine core, the insulation blanket extending along the length, and the core compartment having a second boundary with the insulation blanket;
a cavity extending between and bounded by the inner wall and the insulation blanket along the length wherein at least a portion of each of the cavity and thermal blanket are located aft of a turbine blade of the turbine;
a first orifice through the inner wall inputting a portion of the air from the fan duct into to the cavity, wherein the portion of the air pressurizes the cavity at a first pressure; and
providing a second orifice through the insulation blanket coupling the first pressure to the core compartment through the second orifice; and
providing a valve coupled to the second orifice, regulating flow of the air passing through the second orifice, and regulating the first pressure in the cavity so that the first pressure in the cavity exceeds a second pressure in the core compartment and suppresses flow of hotter air from the core compartment into the cavity.

17. The method of claim 16, further comprising: providing a tube connected to the second orifice, the tube delivering at least some of the portion of the air to a predetermined location or component in the core compartment where dedicated cooling is required and providing a second valve connected to the tube, wherein the second valve regulates flow of air in the tube.

18. The method of claim 17, further comprising: positioning the second orifice so as to direct a portion of the air through the second orifice.

19. The method of claim 16, further comprising:
determining a sizing and a positioning of the first orifice and the second orifice using an iterative process including computational fluid dynamics analysis (CFD), flow network modeling, laboratory testing, and flight testing,
wherein the sizing and the positioning are such that first pressure P2 in the cavity exceeds the second pressure P3 in the core compartment, the first pressure suppressing a flow of hotter air from the core compartment into the cavity at all times during a take-off, a landing, and a flight of the aircraft powered by the aircraft engine.

20. The method of claim 19, further comprising:
(a) performing the Computational Fluid Dynamics (CFD) analysis, wherein the CFD analysis determines a pressure in the cavity as a function of a first size of the first orifice, a second size of the second orifice, a height of the cavity, and the positioning of the first orifice and the second orifice;
(b) selecting the height (H) of the cavity, the first size of the first orifice, the second size of the second orifice, and the positioning of the first orifice (A1) and the second orifice (A2) such that the first pressure in the cavity exceeds the second pressure in the core compartment according to the CFD analysis;
(c) manufacturing a pressurization system having the height (H), the first size of the first orifice, the second size of the second orifice, and the positioning of the first orifice and the second orifice selected in step (b);
(d) performing the laboratory testing measuring a pressure distribution, including initial pressure boundary conditions, in the pressurization system manufactured in step (c) for a plurality of airflow rates in the fan duct encountered during the flight, the take-off, and the landing of the aircraft powered by the aircraft engine;

(e) performing the flow network modeling, comprising:
   (i) constructing a flow network model modeling the pressure distribution as a function of altitude of the aircraft and engine thrust of the aircraft engine, using the initial pressure boundary conditions; and
   (ii) using the flow network model to obtain updated sizing and positioning of the first orifice and the second orifice that achieve the first pressure in the cavity that exceeds the second pressure in the core compartment when the pressurization system is installed in the aircraft engine on the aircraft, wherein the pressure is uniform within 10% across the first boundary and the second boundary during the take-off, the flight, and the landing of the aircraft;

(f) installing the pressurization system comprising the first orifice and second orifice having the updated sizing and positioning, in the aircraft engine on the aircraft; and (g) measuring actual pressure distribution and actual boundary conditions in the pressurization system installed in the aircraft engine on the aircraft so as to determine whether, at all times during the take-off, the landing, and the flight of the aircraft:

(1) the first pressure in the cavity exceeds the second pressure in the core compartment, and (2) the first pressure in the cavity is uniform within 10% across the first boundary and the second boundary.

21. The method of claim 20, further comprising:

comparing the actual pressure distribution with the pressure distribution modeled using the flow network model;

updating the flow network model using the actual boundary conditions that are different from the initial boundary conditions, so as to form an updated flow network model;

using the updated flow network model to obtain further updated sizing and positioning of the first orifice and the second orifice that achieve the first pressure in the cavity that exceeds the second pressure in the core compartment when the pressurization system is installed in the aircraft engine, wherein the pressure is uniform within 10% across the first boundary and the second boundary during the take-off, the landing, and the flight of the aircraft; and manufacturing the pressurization system comprising the first orifice and second orifice having the further updated sizing and positioning.

* * * * *